United States Patent
Kleinert

(10) Patent No.: US 8,553,311 B2
(45) Date of Patent: Oct. 8, 2013

(54) METHOD FOR ACCOMPLISHING HIGH-SPEED INTENSITY VARIATION OF A POLARIZED OUTPUT LASER BEAM

(75) Inventor: Jan Kleinert, Wilsonville, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 252 days.

(21) Appl. No.: 12/753,578

(22) Filed: Apr. 2, 2010

(65) Prior Publication Data

US 2011/0242639 A1    Oct. 6, 2011

(51) Int. Cl.
  G02B 26/00    (2006.01)
  G02B 26/08    (2006.01)
  G02B 21/26    (2006.01)
  G02B 21/14    (2006.01)

(52) U.S. Cl.
  USPC ............. 359/290; 359/196.1; 353/37; 353/82

(58) Field of Classification Search
  USPC .................. 359/290, 196.1, 197.1, 198.1, 359/200.1–200.3, 204.2, 212.1–214.1, 359/221.1–221.3, 291, 889, 891, 558, 215, 359/224, 567, 568, 726, 732, 230, 238, 245, 359/279, 316, 634, 292, 298; 353/30, 34, 353/37, 69, 82
  See application file for complete search history.

(56) References Cited

U.S. PATENT DOCUMENTS

| 4,085,423 A * | 4/1978 | Tsunoda et al. ........... 369/44.37 |
| 4,532,402 A | 7/1985 | Overbeck |
| 5,963,364 A | 10/1999 | Leong et al. |
| 7,959,305 B2 * | 6/2011 | Destain ........................ 353/99 |
| 2001/0055140 A1 | 12/2001 | Sakai et al. |
| 2002/0088927 A1 * | 7/2002 | Simchoni ...................... 250/225 |
| 2003/0035111 A1 * | 2/2003 | Nevis ............................ 356/484 |
| 2003/0043445 A1 | 3/2003 | Miller et al. |

FOREIGN PATENT DOCUMENTS

| EP | 1591762 B1 | 2/2009 |
| JP | 2004-343091 A | 12/2004 |

OTHER PUBLICATIONS

Kemp et al., "Petawatts Place Tough Requirements on Optics," http://optics.org/cws/article/research/30002, May 18, 2007.
Rocky Mountain Instrument, Inc., "High Power Thin Film Plate Polarizers," http://www.rmico.com/specifications/polarizers/high-power-thin-film-plate, visited Mar. 15, 2010.
Rocky Mountain Instrument, Inc., "IR Thin Film Plate Polarizers," http://www.rmico.com/specifications/polarizers/ir-thin-film-plate, visited Mar. 15, 2010.
International Search Report for PCT/US2011/028812, Nov. 28, 2011.

* cited by examiner

*Primary Examiner* — Dawayne A Pinkney
(74) *Attorney, Agent, or Firm* — Stoel Rives LLP

(57) ABSTRACT

A method of accomplishing high-speed intensity variation of a polarized output laser beam includes securing an angle of light incidence sensitive optical element to a galvanometer system that provides high-speed transitioning of the angle of light incidence sensitive optical element between different angular positions. The high-speed transitioning provided by the galvanometer system varies an angle of incidence between an input laser beam and the angle of light incidence sensitive optical element to thereby provide high-speed variation of an intensity of a polarized output laser beam produced by the angle of light incidence sensitive optical element.

13 Claims, 3 Drawing Sheets

METHOD FOR ACCOMPLISHING HIGH-SPEED INTENSITY VARIATION OF A POLARIZED OUTPUT LASER BEAM

TECHNICAL FIELD

This disclosure relates to optical systems and, in particular, to a laser beam optical system and method for varying the intensity of a polarized output laser beam.

BACKGROUND INFORMATION

In many laser processing applications, the intensity of a polarized laser beam is varied (e.g., attenuated) using an optical attenuator. In one conventional approach, a combination of a rotating waveplate (or an electro-optic modulator (EOM)) and a subsequent polarizer are used to produce a polarized laser beam having a variable intensity. For example, in a system using a rotating waveplate and subsequent polarizer, the rotating waveplate and subsequent polarizer are positioned in a beam path of a laser beam, and the rotating waveplate is rotated about an axis parallel to the beam path to rotate a polarization vector, which changes the intensity of a polarized laser beam exiting the subsequent polarizer. In another conventional approach, an acousto-optic modulator (AOM) is utilized to produce a polarized laser beam having a variable intensity. In a system using an AOM, an acousto-electric transducer (e.g., a piezo-electric transducer) changes the intensity of a sound wave created in a medium (e.g., glass, quartz) to thereby vary the intensity of a laser beam incident on and diffracted by the medium.

Conventional approaches have a number of shortcomings. For example, an optical attenuator including a rotating waveplate and a subsequent polarizer is relatively slow at varying beam intensity. Although an AOM can quickly vary beam intensity (in about 100 nanoseconds or less), a system implementing an AOM is typically complex, optical alignment of the system is relatively challenging, and the beam path is relatively long. Moreover, an AOM typically has a peak diffraction efficiency below 90% (e.g., about 85%).

What is needed is a system that can quickly vary the intensity of a laser beam, is characterized by optical simplicity, and has a relatively high peak transmission efficiency.

SUMMARY OF THE DISCLOSURE

A preferred method of accomplishing high-speed intensity variation of a polarized output laser beam entails generating an input laser beam propagating along a first portion of a beam path toward a target location on a workpiece. The method also includes providing a galvanometer system including a galvanometer drive member cooperating with a rotatable drive shaft to rotate the rotatable drive shaft about a rotation axis that is transverse to the first portion of the beam path. The galvanometer drive member controls rotation of the rotatable drive shaft to provide high-speed transitioning of the rotatable drive shaft between selected angular positions.

An angle of light incidence sensitive optical element secured to the rotatable drive shaft enables rotation of the angle of light incidence sensitive optical element about the rotation axis. The angle of light incidence sensitive optical element includes a planar optical film positioned to intersect the first portion of the beam path so that the input laser beam is incident on the planar optical film at an angle of incidence determined by an angular position of the rotatable drive shaft. The planar optical film produces from the input laser beam a polarized output laser beam that propagates along a second portion of the beam path toward the target location on the workpiece. The polarized output laser beam is characterized by an intensity that varies as a function of the angle of incidence between the input laser beam and the planar optical film. The high-speed transitioning of the rotatable drive shaft by the galvanometer drive member changes the angle of incidence between the input laser beam and the planar optical film to thereby accomplish high-speed variation of the intensity of the polarized output laser beam.

Additional aspects and advantages will be apparent from the following detailed description of preferred embodiments, which proceeds with reference to the accompanying drawings.

DETAILED DESCRIPTION OF PREFERRED EMBODIMENTS

Figure 1:
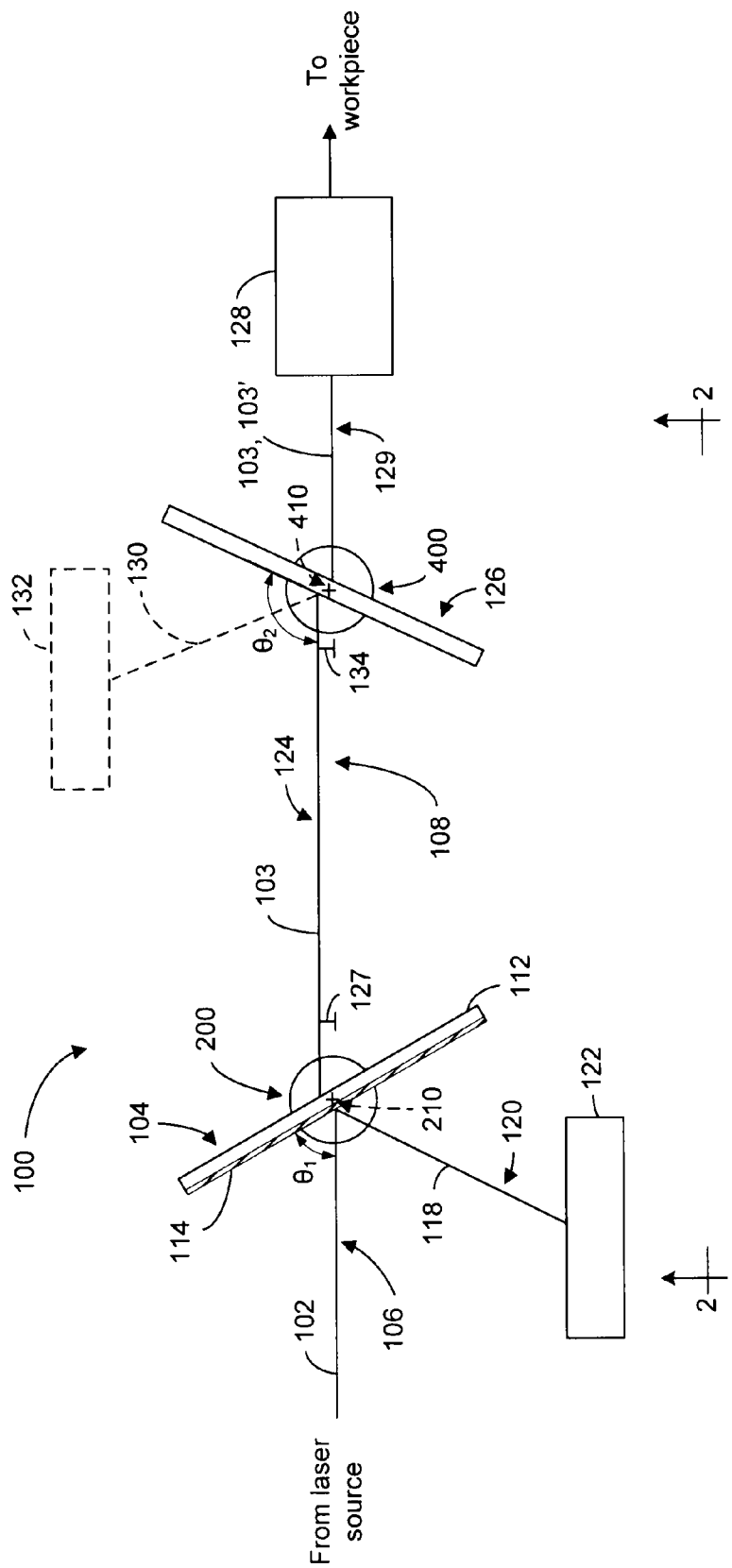
FIG. 1 is a schematic block diagram of a system for accomplishing high-speed intensity variation of a polarized output laser beam according to one embodiment.

FIG. 1 is a schematic block diagram showing the hardware architecture of an embodiment of a system 100 for selectively attenuating an input laser beam 102 to produce a polarized output laser beam 103 of varying intensity (e.g., power level). Input laser beam 102 includes p-polarized light and, preferably, excludes substantially all s-polarized light. Input laser beam 102 is generated by a conventional laser source (not shown), such as, but not limited to, an ultraviolet (UV) laser source (e.g., a 355 nm laser). System 100 includes an angle of light incidence sensitive optical element 104 positioned to intersect a first portion 106 of a beam path 108 along which input laser beam 102 propagates towards a target location on a workpiece (not shown). In one example, optical element 104 is a polarizer, preferably a thin-film polarizer. However, any other optical element may be used that is characterized by an incident light transmission efficiency that varies as a function of an angle of incidence between the optical element and incident light as described in further detail below. Optical element 104 includes a substrate 112 made of glass or a glass-like material on which a planar optical film 114 (e.g., an optical coating) is formed. Substrate 112 may be a relatively flat plate as depicted in FIG. 1. Alternatively, substrate 112 may be wedge-shaped and fixed (e.g., cemented) to a second wedge-shaped substrate to form a cube in which planar optical film 114 cuts diagonally across the center of the cube.

Planar optical film 114 separates input laser beam 102 into a transmitted light component, corresponding to polarized output laser beam 103, and a reflected light component 118. Polarized output laser beam 103 includes p-polarized light having an intensity level that is variable and dependent on an angle of incidence $\theta_1$ between planar optical film 114 and input laser beam 102 as described below. Preferably, polarized output laser beam 103 excludes s-polarized light. Reflected light component 118 also includes p-polarized light having an intensity level that varies in an inverse relationship to variations of the intensity level of polarized output laser beam 103. If input laser beam 102 includes s-polarized light in addition to p-polarized light, polarized output laser beam 103 and reflected light component 118 may also include s-polarized light having variable intensity levels that are functions of the angle of incidence $\theta_1$.

Reflected light component 118 travels along a reflected beam path 120 to a laser dump element 122 that absorbs reflected light component 118 to prevent it from reaching the workpiece. In a first embodiment, polarized output laser beam 103 travels along a second portion 124 of beam path 108 to a second optical element 126 positioned to intersect polarized output laser beam 103. Second optical element 126 is a beam displacement optical element that is provided to compensate for a beam offset 127, described in more detail below, introduced by optical element 104. In an alternative, second embodiment (not shown), second optical element 126 is omitted, and polarized output laser beam 103 continues traveling along second portion 124 of beam path 108 to subsequent conventional optics 128 (e.g., focusing lens, beam positioner) that condition polarized output laser beam 103 for incidence at the target location on the workpiece. The following description is directed to the first embodiment.

Second optical element 126 receives polarized output laser beam 103 and transmits it (or a portion of polarized output laser beam 103) along a third portion 129 of beam path 108 to optics 128. Like optical element 104, second optical element 126 may be an angle of light incidence sensitive optical element that includes a planar optical film that separates some of the light of polarized output laser beam 103 from beam path 108 to produce a reflected light beam 130, while the remainder of polarized output laser beam 103 (represented by reference number 103') is transmitted through second optical element 126 along third portion 129 of beam path 108. In one example, second optical element 126 is a thin-film polarizer. When second optical element 126 includes a planar optical film that produces reflected light beam 130, a second laser dump element 132 is provided to absorb reflected light beam 130. Alternatively, second optical element 126 may be an anti-reflection coated plate, in which case reflected light beam 130 is not produced, second laser dump element 132 is omitted, and substantially all of polarized output laser beam 103 is transmitted through second optical element 126 along third portion 129 of beam path 108.

As shown in FIG. 1, second portion 124 of beam path 108 is offset from first portion 106 by an amount corresponding to beam offset 127. Second optical element 126 is provided in system 100 to displace third portion 129 of beam path 108 from second portion 124 by a displacement amount 134 that is substantially equal in magnitude of and opposite in direction to beam offset 127 so that third portion 129 of beam path 108 is aligned with first portion 106. In other words, second optical element 126 is optionally provided to compensate for beam offset 127 introduced by optical element 104.

Figure 2:
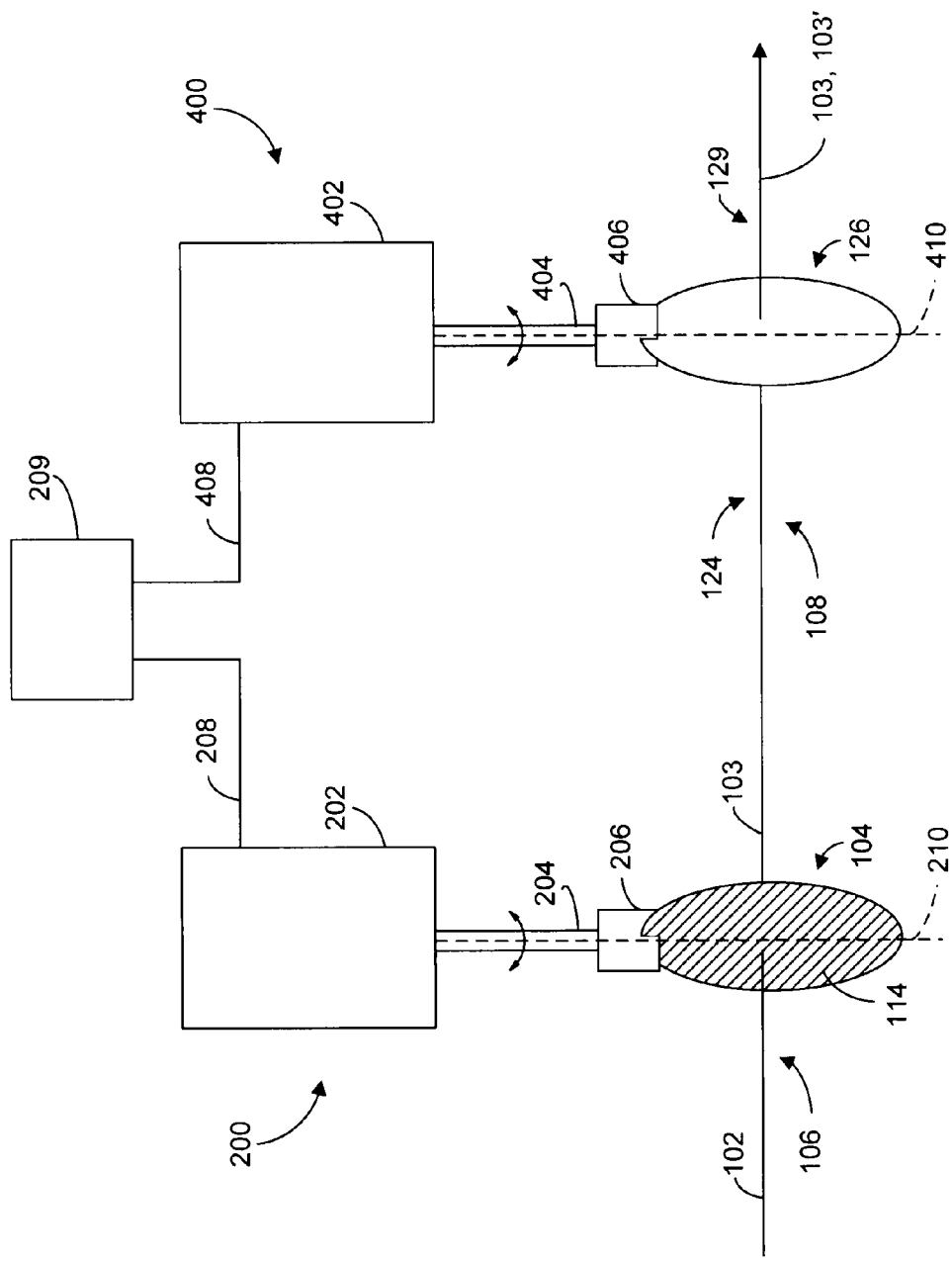
FIG. 2 is a bottom view of various parts of the system taken along lines 2-2 of FIG. 1.

FIG. 2 is a bottom view of system 100 (excluding dump elements 122 and 132 for clarity) showing a galvanometer system 200 that cooperates with optical element 104 to control the angle of incidence $\theta_1$ and, thus, the intensity level of polarized output laser beam 103. Galvanometer system 200 includes a galvanometer drive member 202 cooperating with a rotatable drive shaft 204. Conventional galvanometer systems typically include a mirror secured to a drive shaft to direct a laser beam to different target locations on a workpiece. For example, U.S. Pat. No. 4,532,402, titled "Method and Apparatus for Positioning a Focused Beam on an Integrated Circuit," describes a conventional galvanometer system. In galvanometer system 200, however, a conventional mirror is replaced with optical element 104, which is secured to an end of drive shaft 204 via a mount 206, such as a mounting shoe, to enable high-speed attenuation of polarized output laser beam 103.

In response to a control signal 208 received from a processor 209, galvanometer drive member 202 rotates shaft 204 and optical element 104 about a rotation axis 210 that is transverse to first portion 106 of beam path 108. In FIG. 1, rotation axis 210 extends into and out of the plane of the figure. Processor 209 operates according to information (e.g., a computer program) that associates selected intensity levels of polarized output laser beam 103 with corresponding angular positions of shaft 204 and optical element 104. When a selected intensity level for polarized output laser beam 103 is desired, processor 209 transmits control signal 208, which includes instructions representing the corresponding angular position associated with the selected intensity level, to galvanometer drive member 202. Galvanometer drive member 202 responds to control signal 208 by rotating shaft 204 and optical element 104 to the corresponding angular position.

Galvanometer system 200 operates to transition shaft 204 at a relatively high speed and with accurate precision to the corresponding angular positions dictated by processor 209. Thus, by securing optical element 104 to shaft 204, galvanometer system 200 is able to quickly change the angle of incidence $\theta_1$ between planar optical film 114 and input laser beam 102 and accurately position optical element 104 at the corresponding angular positions associated with the selected intensity levels of polarized output laser beam 103. In one example, galvanometer system 200 can rotate optical element 104 between different ones of the corresponding angular positions in less than 10 millisecond (ms), preferably about 200 microseconds (μs).

By changing the extent of the angle of incidence $\theta_1$, galvanometer system 200 is able to control the intensity level of the p-polarized light of polarized output laser beam 103. As described above, planar optical film 114 operates to transmit some and reflect some of the p-polarized light of input laser beam 102. The amount of p-polarized light transmitted by planar optical film 114 is dependent on the angle of incidence $\theta_1$ between planar optical film 114 and input laser beam 102. In other words, the intensity level of the p-polarized light of polarized output laser beam 103 varies as a function of the angle of incidence $\theta_1$. In one example, the intensity level of the p-polarized light of polarized output laser beam 103 is at a maximum when the angle of incidence $\theta_1$ corresponds to Brewster's angle. The amount of p-polarized light reflected by planar optical film 114 is also dependent on the angle of incidence $\theta_1$, but varies inversely to the amount of p-polarized light transmitted by planar optical film 114. Thus, in one example, the intensity level of the p-polarized light of reflected light component 118 is at a minimum when the angle of incidence $\theta_1$ is at Brewster's angle.

Figure 3:
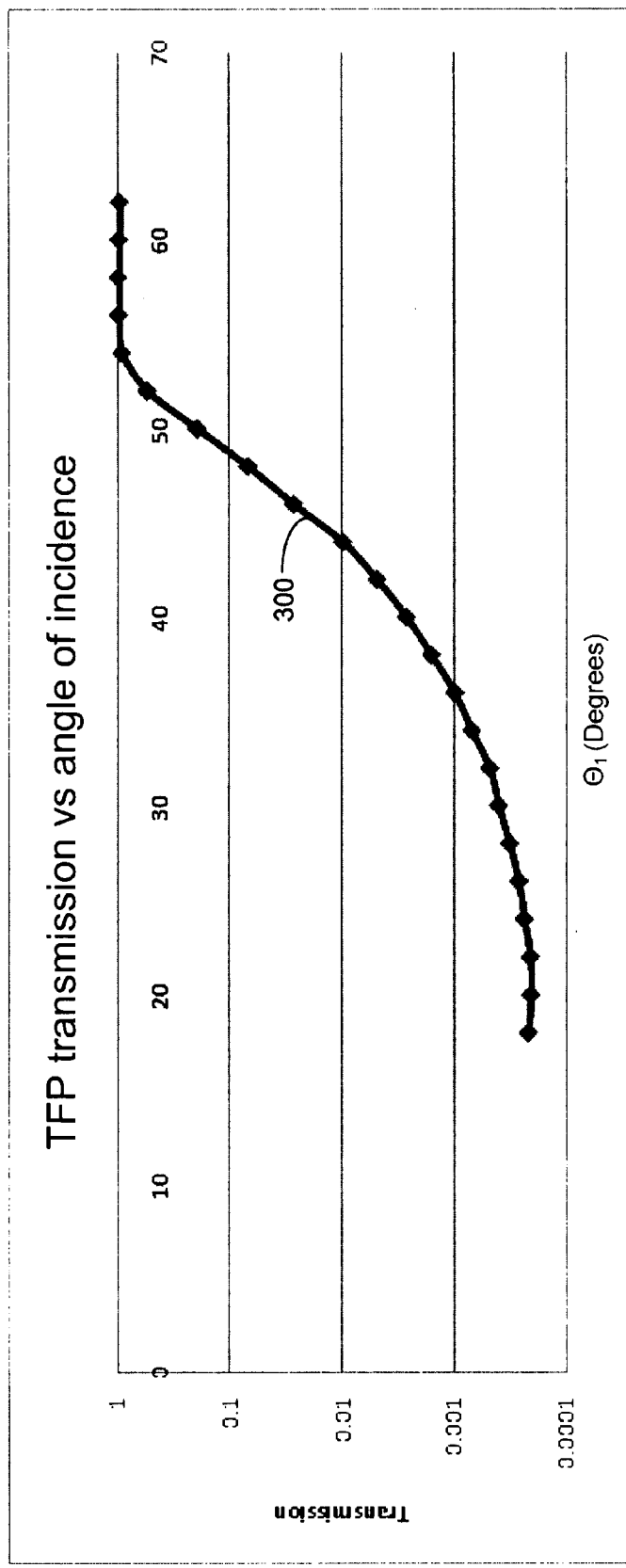
FIG. 3 is a graph representing the transmission efficiency of an angle of light incidence sensitive optical element of the system of FIG. 1 versus an angle of incidence between a planar optical film of the angle of light incidence sensitive optical element and an incident laser beam.

FIG. 3 shows a curve 300 representing the p-polarized light transmission efficiency of optical element 104 versus the angle of incidence $\theta_1$ according to one example in which optical element 104 is a thin-film polarizer and input laser beam 102 has a wavelength of about 355 nm. In FIG. 3, the ordinate axis (i.e., the transmission axis) ranges from 0.0001-1, where 0.0001 represents 0.01% of p-polarized incident light being transmitted and 1 corresponds to 100% of p-polarized incident light being transmitted. In this example, Brewster's angle corresponds to an angle of about 56.6 degrees, and optical element 104 is operable to transmit nearly 100% (e.g., greater than 95%) of the p-polarized light of input laser beam 102 when the angle of incidence $\theta_1$ is at Brewster's angle. Curve 300 shows that the intensity level of the p-polarized light of polarized output laser beam 103 decreases when the angle of incidence $\theta_1$ deviates away from (e.g., becomes less than) Brewster's angle. For example, the intensity level of the p-polarized light of polarized output laser beam 103 is less than 0.1% of the intensity level of the p-polarized light of input laser beam 102 when the angle of incidence $\theta_1$ is about 25 degrees. Accordingly, galvanometer system 200 can quickly and accurately attenuate polarized output laser beam 103 to a desired intensity level by rotating optical element 104 about rotation axis 210 to a selected angular position. Because system 100 includes galvanometer system 200 that is operable to quickly rotate optical element 104, system 100 enables dynamic laser beam attenuation that is much faster than a conventional rotating waveplate and subsequent polarizer. Moreover, compared to an AOM system, system 100 can achieve greater maximum transmission efficiency and can be implemented with less optical complexity, which makes system 100 easier to align and allows system 100 to have a shorter necessary beam path.

When galvanometer system 200 varies the angle of incidence $\theta_1$, the extent of beam offset 127 also varies. Accordingly, system 100 optionally includes a second galvanometer system 400 cooperating with second optical element 126 to compensate for the variation of beam offset 127. Second galvanometer system 400 includes a galvanometer drive member 402 cooperating with a rotatable drive shaft 404. Second optical element 126 is secured to an end of drive shaft 404 via a mount 406, such as a mounting shoe. In response to a control signal 408 received from processor 209, galvanometer drive member 402 rotates shaft 404 and second optical element 126 about a rotation axis 410 that is transverse to second portion 124 of beam path 108 to change an angle of incidence $\theta_2$ between second optical element 126 and polarized output laser beam 103. When the angle of incidence $\theta_2$ changes, the extent of displacement amount 134 changes. Accordingly, processor 209 operates according to information (e.g., a computer program) that coordinates rotation of second optical element 126 with rotation of optical element 104 so that third portion 129 of beam path 108 remains aligned with first portion 106. When processor 209 transmits control signal 208 to galvanometer drive member 202 to rotate optical element 104, processor 209 also transmits control signal 408, which includes instructions representing an angular position of second optical element 126, to galvanometer drive member 402, and galvanometer drive member 402 rotates second optical element 126 in coordination with rotation of optical element 104 to keep third portion 129 of beam path 108 aligned with first portion 106. Moreover, when second optical element 126 is an angle of light incidence sensitive optical element like optical element 104, galvanometer system 400 may also rotate second optical element 126 about rotation axis 410 to increase the extent to which system 100 can attenuate polarized output laser beam 103.

When the angle of incidence $\theta_1$ changes due to rotation of optical element 104, reflected beam path 120 shifts to the left or right from its position in FIG. 1. Accordingly, in one embodiment, laser dump element 122 is large enough so that reflected light component 118 is incident on laser dump element 122 over the extent of the shifting of reflected beam path 120. In an alternative embodiment, laser dump element 122 moves in cooperation with the shifting of reflected beam path 120 to ensure that reflected light component 118 is incident on laser dump element 122. Moreover, when second optical element 126 includes a planar optical film that produces reflected light beam 130, laser dump element 132 may be designed according to one of the embodiments of laser dump element 122 to capture reflected light beam 130 as it shifts in response to changes in the angle of incidence $\theta_2$.

It will be obvious to skilled persons that many changes may be made to the details of the above-described embodiments without departing from the underlying principles of the invention. For example, it is contemplated that reflected light component 118 can be used as a variable intensity processing beam in place of or in addition to polarized output laser beam 103. The scope of the present invention should, therefore, be determined only by the following claims.

The invention claimed is:

1. A method of controlling dynamic, rapid attenuation of a polarized output laser beam intensity uniformly across a spatial intensity profile of the output laser beam as it is switched between a first power intensity level and a second power intensity level, the first power intensity level being suitable for laser processing a workpiece, and the second power intensity level being sufficiently low so as not to affect the physical character of the workpiece, the method comprising:

generating an input laser beam propagating along a first beam path portion of a beam path toward a target location on the workpiece;

directing the input laser beam propagating along the first beam path portion to a galvanometer system including a rotatable shaft that rotates about a rotation axis positioned transversely of the first beam path portion, the rotatable shaft carrying an angle of light incidence-sensitive optical element including a planar optical film positioned to receive and produce from the input laser beam the polarized output laser beam that propagates along a second beam path portion of the beam path toward the target location on the workpiece, the spatial intensity profile of the polarized output laser beam varying as a function of an angle of incidence between the input laser beam and the planar optical film;

applying to the galvanometer system a control signal produced by a processor to control rotation of the rotatable shaft and thereby angular positioning of the planar optical film; and providing shaft positioning information to which the processor responds to produce the control signal for angular positioning the planar optical film to change the angle of incidence between a first angle that establishes the first power intensity level suitable for laser processing the workpiece and a second angle that establishes the second power intensity level that does not affect the physical character of the workpiece, and thereby provide uniformly across the spatial intensity profile dynamic, rapid attenuation of the polarized output laser beam.

2. The method of claim 1, in which the planar optical film separates the input laser beam into first and second light components to thereby produce the polarized output laser beam, the polarized output laser beam corresponding to the first light component.

3. The method of claim 2, in which the planar optical film separates the input laser beam into the first and second light components by transmitting the first light component through the planar optical film and by reflecting the second light component off the planar optical film.

4. The method of claim 3, further comprising providing a laser dump element positioned to intersect the second light component reflected off the planar optical film, the laser dump element absorbing the second light component to inhibit it from reaching the workpiece.

5. The method of claim 1, in which the optical element is a thin-film polarizer.

6. The method of claim 1, in which the angle of light incidence-sensitive optical element introduces a beam offset between the first and second beam path portions of the beam path, the method further comprising positioning a beam displacement optical element to intersect the second beam path portion of the beam path so that the polarized output laser beam is incident on the beam displacement optical element, the beam displacement optical element transmitting at least a portion of the polarized output laser beam along a third beam path portion of the beam path toward the target location, and the beam displacement optical element displacing the third beam path portion of the beam path from the second beam path portion of the beam path by a displacement amount that compensates for the beam offset between the first and second beam path portions of the beam path.

7. The method of claim 6, in which the galvanometer system is a first galvanometer system, the rotatable shaft is a first rotatable shaft, the angle of incidence between the planar optical film and the input laser beam is a first angle of incidence, and the rotation axis is a first rotation axis, the method further comprising:
  directing the polarized output laser beam propagating along the second beam path portion to a second galvanometer system including a second rotatable shaft that rotates about a second rotation axis positioned transversely of the second beam path portion, the second rotatable shaft carrying the beam displacement optical element to enable rotation of the beam displacement optical element about the second rotation axis, and the second galvanometer system rotating the second rotatable shaft and the beam displacement optical element about the second rotation axis to adjust a second angle of incidence between the beam displacement optical element and the polarized output laser beam.

8. The method of claim 7, in which an extent of the beam offset between the first and second beam path portions of the beam path is a function of the first angle of incidence and the displacement amount between the second and third beam path portions of the beam path is a function of the second angle of incidence, the second galvanometer system rotating the second rotatable shaft and the beam displacement optical element about the second rotation axis to thereby adjust the displacement amount in response to a change in the beam offset.

9. The method of claim 6, in which the beam displacement optical element is an anti-reflection coated plate.

10. The method of claim 6, in which the beam displacement optical element is a thin-film polarizer.

11. The method of claim 1, further comprising:
  completing the laser processing of the workpiece at the first power intensity level; and
  in response to completing the laser processing, changing the angle of incidence from the first angle that establishes the first power intensity level to the second angle that establishes the second power intensity level.

12. The method of claim 11, in which the step of changing the angle of incidence is performed in a period of less than 10 milliseconds.

13. The method of claim 11, in which the step of changing the angle of incidence is performed in a period of less than 200 microseconds.

* * * * *